US012737622B2

(12) United States Patent
Golov et al.

(10) Patent No.: US 12,737,622 B2
(45) **Date of Patent: *Sep. 15, 2026**

(54) ANN TRAINING TROUGH PROCESSING POWER OF PARKED VEHICLES

(71) Applicant: Micron Technology, Inc., Boise, ID (US)

(72) Inventors: Gil Golov, Backnang (DE); Robert Richard Noel Bielby, Placerville, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/177,689

(22) Filed: Mar. 2, 2023

(65) Prior Publication Data

US 2023/0206071 A1 Jun. 29, 2023

Related U.S. Application Data

(63) Continuation of application No. 16/850,946, filed on Apr. 16, 2020, now Pat. No. 11,604,989.

(51) Int. Cl.

| | |
|---|---|
| ***G06F 9/50*** | (2006.01) |
| ***G06N 3/045*** | (2023.01) |
| ***G06N 3/08*** | (2023.01) |
| ***G08G 1/01*** | (2006.01) |

(52) U.S. Cl.

CPC ............... *G06N 3/08* (2013.01); *G06N 3/045* (2023.01)

(58) Field of Classification Search

CPC .......... G06N 3/08; G06N 3/045; G06N 3/063; G06F 9/5066; G06F 2209/503; G08G 1/0112; G08G 1/0133

See application file for complete search history.

(56) References Cited

U.S. PATENT DOCUMENTS

| | | | | |
|---|---|---|---|---|
| 10,106,153 | B1 * | 10/2018 | Xiao | B62D 15/02 |
| 10,395,144 | B2 * | 8/2019 | Zeng | G05D 1/0246 |
| 10,991,242 | B2 * | 4/2021 | Taylor | H04Q 9/00 |

(Continued)

OTHER PUBLICATIONS

Extended European Search Report, EP21788563.1, mailed on Apr. 9, 2024.

(Continued)

*Primary Examiner* — Nghia M Doan

(74) *Attorney, Agent, or Firm* — Greenberg Traurig

(57) ABSTRACT

A system for ANN training through processing power of parked vehicles. The system can include a master computing device having a controller configured to control training of an ANN. The training can be performed at least partially in separate parts by computing devices of parked vehicles. The controller can be configured to separate computing tasks of training the ANN into separated tasks. Also, the controller can be configured to assign at least some of the separated tasks to selected computing devices of parked vehicles. The controller can also be configured to receive and assemble results of the separated tasks to train the ANN. The controller can also be configured to train the ANN according to the results. The master computing device can be configured to send the assigned tasks to the selected devices of the vehicles as well as receive, from the selected devices, the results of the assigned tasks.

21 Claims, 6 Drawing Sheets

(56) References Cited

U.S. PATENT DOCUMENTS

| | | | | |
|---|---|---|---|---|
| 11,604,989 | B2 * | 3/2023 | Golov | G06N 3/08 |
| 11,675,618 | B2 * | 6/2023 | Park | G06F 9/451<br>718/107 |
| 2010/0165997 | A1 * | 7/2010 | Matsumoto | H04L 45/50<br>370/400 |
| 2016/0050718 | A1 | 2/2016 | Follman | |
| 2018/0341525 | A1 | 11/2018 | Gupta et al. | |
| 2019/0041852 | A1 | 2/2019 | Schubert et al. | |
| 2019/0050718 | A1 * | 2/2019 | Tickoo | G01C 21/28 |
| 2019/0095796 | A1 | 3/2019 | Chen et al. | |
| 2019/0205744 | A1 | 7/2019 | Mondello et al. | |
| 2019/0295013 | A1 | 9/2019 | Lhota et al. | |
| 2019/0392307 | A1 | 12/2019 | Liao et al. | |
| 2020/0027019 | A1 | 1/2020 | Yang et al. | |
| 2021/0326692 | A1 | 10/2021 | Golov et al. | |

OTHER PUBLICATIONS

Huang, Jin, et al., "Using NARX Neural Network based Load Prediction to Improve Scheduling Decision in Grid Environments." Third International Conference on natural Computation, IEEE, Aug. 1, 2007.

International Search Report and Written Opinion, PCT/US2021/026972, mailed on Jul. 23, 2021.

Title: Ann Training through Processing Power of Parked Vehicles, U.S. Appl. No. 16/850,946, filed Apr. 16, 2020, Confirmation: 5822, Status Date: Feb. 22, 2023, Inventors: Gil Golov, et al., Status: Patented Case.

* cited by examiner

Master Computing Device(s)
140

Master Computing Device
142

Controller 144

ANN
Trainer
148

Interface 146

Vehicle 1
130

Vehicle N
132

Network(s)
122

Vehicle
102

Computing
System
104

ANN
Training
Client
106

1st
Camera
118a

Nth
Camera
118b

GPS
Device
116

1st
Sensor
114a

Nth
Sensor
114b

CAN Bus 120

Body Control
Module
108

Powertrain
Control Module
110

Power Steering
Control Unit
112

ANN TRAINING TROUGH PROCESSING POWER OF PARKED VEHICLES

RELATED APPLICATIONS

The present application is a continuation application of U.S. patent application Ser. No. 16/850,946, filed Apr. 16, 2020, issued as U.S. Pat. No. 11,604,989 on Mar. 14, 2023, the entire disclosure of which application is hereby incorporated herein by reference.

FIELD OF THE TECHNOLOGY

At least some embodiments disclosed herein relate to artificial neural network (ANN) training through processing power of parked vehicles.

BACKGROUND

Artificial neural networks (ANNs) are artificial intelligence (AI) systems that are loosely modeled from biological neural networks. ANNs can be considered AI systems since such systems can artificially learn to perform tasks. An ANN is one of many different types of tools of machine learning. An ANN can artificially learn through example input and generally without being programmed with task-specific rules. For example, when an ANN is used for speech recognition, it may learn to identify audio signals that contain the spoken word "hello" by analyzing example audio signals that are known to contain the spoken word "hello". The results of the computations by the ANN can then be used to identify the spoken word "hello" in other audio signals. In an image recognition example, an ANN may learn to identify images that contain a person by analyzing example images that are known to contain a person. The output of the ANN can then be used to identify a person in other images.

Besides speech and image recognition, ANNs can be used for just about any machine learning task that includes supervised learning. And, such ANNs have been used for medical diagnosis, solving business and technical problems, machine translation, network filtering, filtering in big data systems, playing video games, and real-time generation of new parts of video games and multi-media. ANNs are even being developed to guide decision making in vehicular automation and self-driving cars.

An ANN is based on a set of connected nodes, which are often called artificial neurons. The connected nodes loosely model biological neurons of a brain. The connections between nodes are analogous to synapses in a brain. However, the connections (often called edges) are part of a mathematical model opposed to actual physical elements that transmit signals to and from biological neurons. The artificial neurons or nodes are also a part of the mathematical model and are loosely analogous to biological neurons that can receive signals via synapses and then process and send the signals via synapses.

In an ANN, a connection between nodes can include a number. And, an output of a node can be computed from a function (such as a non-linear function) including a sum or a derivative of a sum of its inputs, or more specifically, a sum or a derivative of a sum of its input connections. Also, artificial neurons and edges often have a weight that adjusts with a learning process. The weight can increase or decrease the number at an edge. Artificial neurons can also have a threshold such that a number of an edge is input for the neuron only if the aggregate of inputs of the neuron exceeds the threshold. Also, typical in an ANN, its nodes or artificial neurons are organized into layers. And, different layers of the ANN can perform different transformations on their inputs. An ANN can include an input layer and an output layer, and transformations occur from the input layer to the output layer. Also, an ANN can include one or more intermediate layers between the input layer and the output layer.

BRIEF DESCRIPTION OF THE DRAWINGS

The present disclosure will be understood more fully from the detailed description given below and from the accompanying drawings of various embodiments of the disclosure.

DETAILED DESCRIPTION

At least some embodiments disclosed herein relate to ANN training through processing power of parked vehicles. At least some embodiments are directed to a system for ANN training through processing power of parked vehicles. In some embodiments, the vehicles that at least partially train the ANN do not need to be parked. The system can include a master computing device having a controller configured to control training of an ANN. The training can be performed at least partially in separate parts by computing devices of parked vehicles. However, as mentioned, in some embodiments the vehicles are not required to be parked. The controller can be configured to separate computing tasks of training the ANN into separated tasks. Also, the controller can be configured to assign at least some of the separated tasks to selected computing devices of parked vehicles. The controller can also be configured to receive and assemble results of the separated tasks to train the ANN. The controller can also be configured to train the ANN according to the results. The training of the ANN, the training of parts of the ANN, or at least some tasks of the training of the ANN can be performed according to a delta rule. The master computing device can be configured to send the assigned tasks to the selected devices of the vehicles as well as receive, from the selected devices of the vehicles, the results of the assigned tasks.

Figure 1:
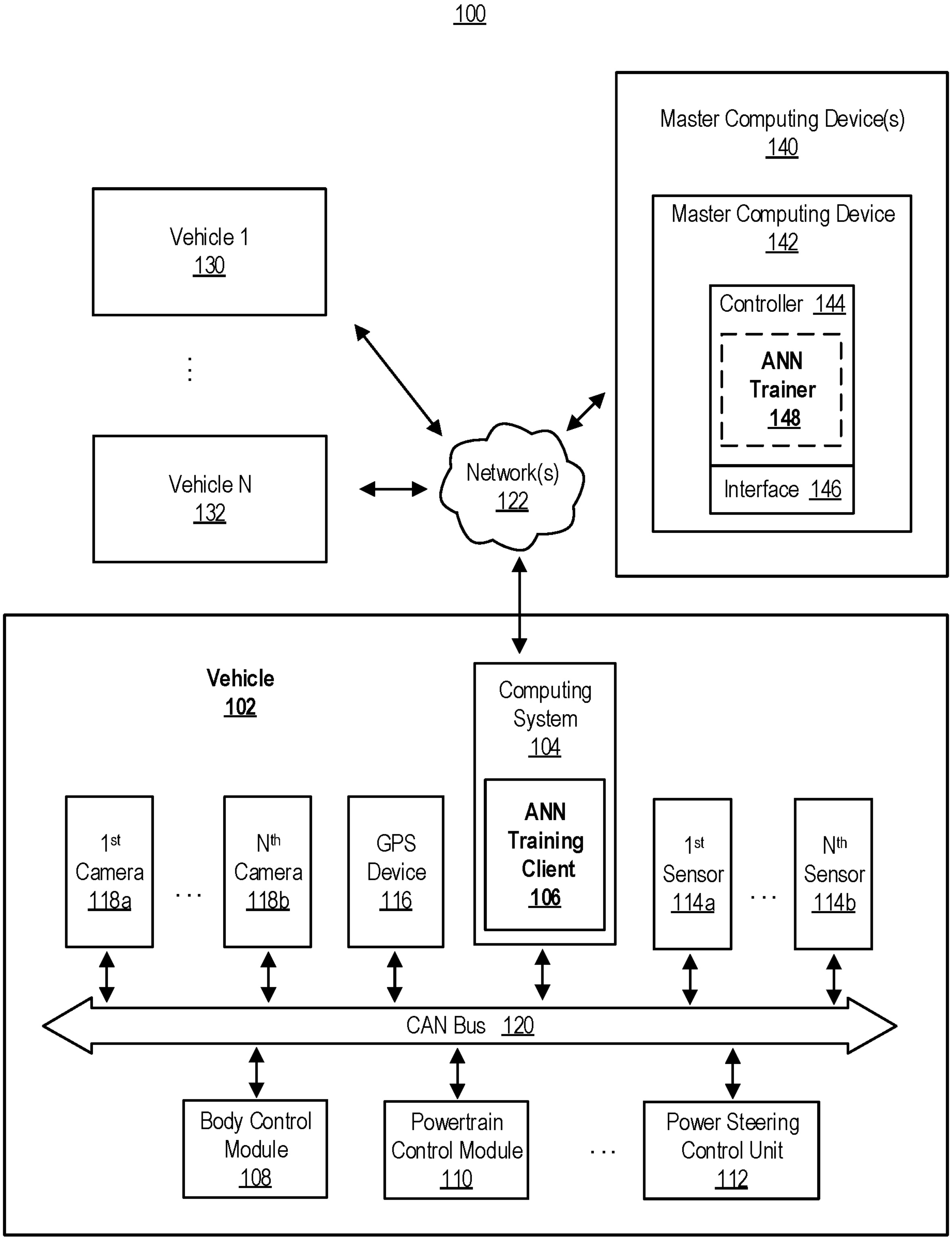
FIGS. 1 to 3 illustrate an example networked system that includes vehicles as well as one or more master computing devices for training ANNs at least partially via computing systems of the vehicles, in accordance with some embodiments of the present disclosure.
Figure 2:
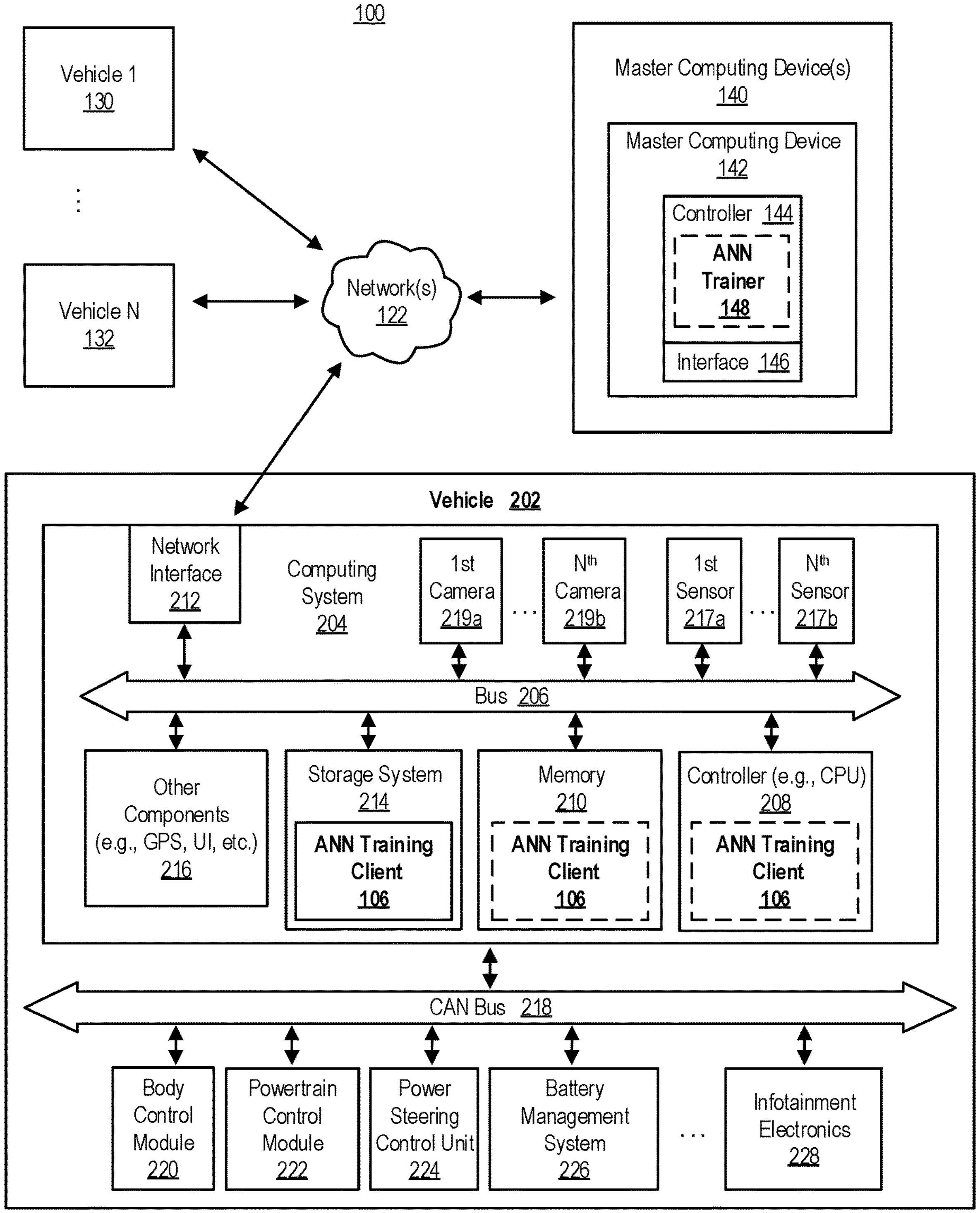
Figure 3:
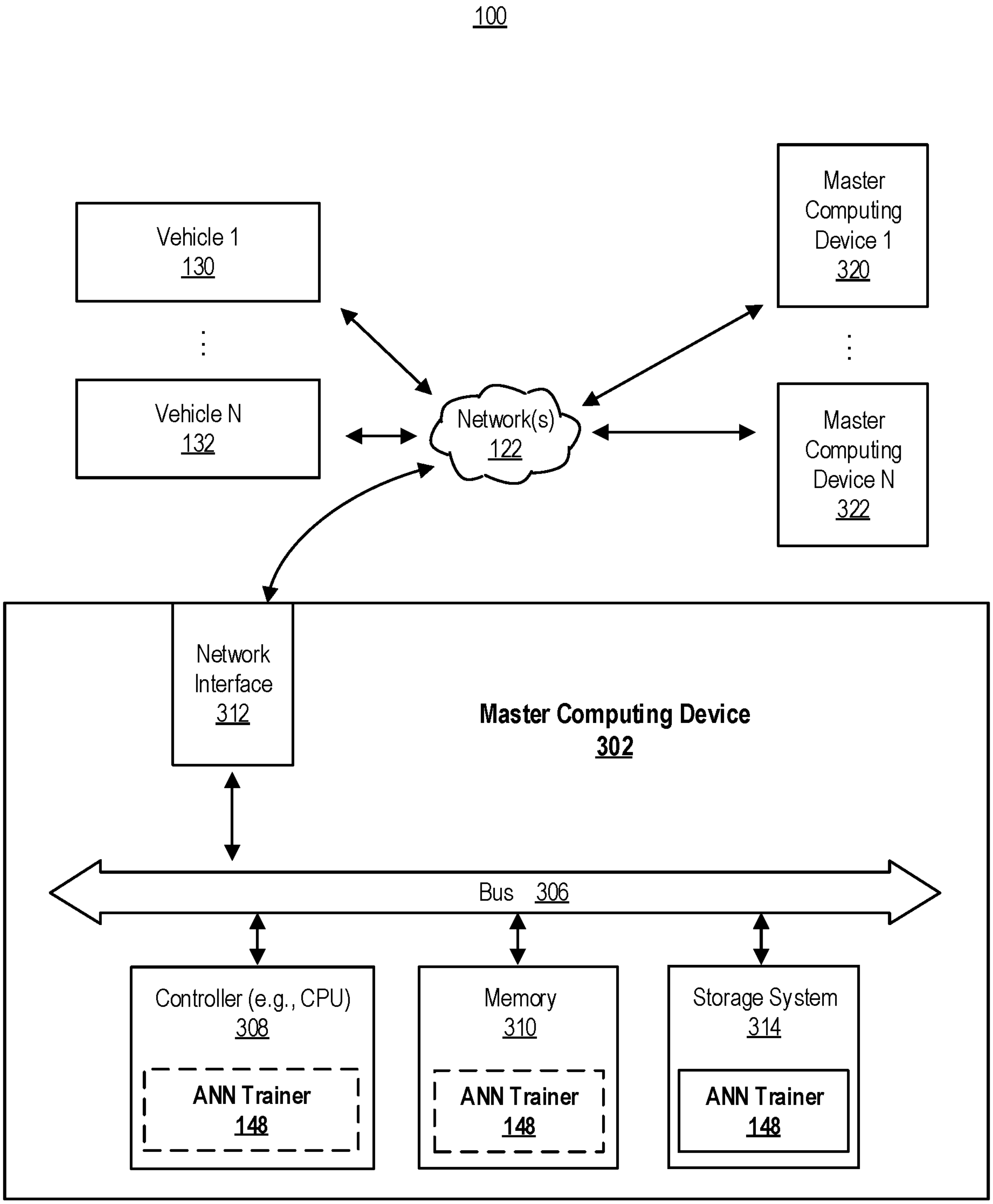

FIGS. 1 to 3 illustrate an example networked system 100 that includes vehicles (e.g., see vehicles 102, 202, and 130 to 132) as well as one or more master computing devices for training ANNs at least partially (e.g., see one or more master computing devices 140 as well as master computing device 142) via computing systems of the vehicles (e.g., see computing systems 104 and 204), in accordance with some embodiments of the present disclosure.

The networked system 100 is networked via one or more communication networks 122. Communication networks described herein, such as communication network(s) 122, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see vehicles 102, 202, and 130 to 132 and master computing device(s) 140) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see computing systems 104 and 204 as well as master computing device(s) 140 and master computing device 142). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104 that includes a ANN training client application 106 associated with an ANN training system (also referred to herein as the ANN training client 106). The vehicle 102 can also include a body and controllable parts of the body (not depicted), a powertrain and controllable parts of the powertrain (not depicted), a body control module 108 (which is a type of ECU), a powertrain control module 110 (which is a type of ECU), and a power steering control unit 112 (which is a type of ECU). The vehicle 102 also includes a plurality of sensors (e.g., see sensors 114*a* to 114*b*), a GPS device 116, a plurality of cameras (e.g., see cameras 118*a* to 118*b*), and a controller area network (CAN) bus 120 that connects at least the vehicle computing system 104, the body control module 108, the powertrain control module 110, the power steering control unit 112, the plurality of sensors, the GPS device 116, and the plurality of cameras to each other.

Also, as shown, the vehicle 102 is connected to the network(s) 122 via the vehicle computing system 104. Also, shown, vehicles 130 to 132 and the master computing device(s) 140 (which includes the master computing device 142) are connected to the network(s) 122, and, thus, are communicatively coupled to the vehicle 102. The ANN training client 106 included in the computing system 104 can communicate with the master computing device(s) 140 as well as the master computing device 142.

In some embodiments, the networked system 100 can include a master computing device (e.g., see master computing device 142). The master computing device can be a single computing device or multiple computing devices depending on the embodiment. Either way, the master computing device can at least include a controller (e.g., see controller 144) as well as a communication interface (e.g., see communication interface 146) that is communicatively coupled to the controller. As shown in FIG. 1, the controller 144 can include an ANN trainer 148. The ANN trainer 148 can include computer hardware and/or software that is configured to train an ANN as well as control training of the ANN when at least some of the training tasks are delegated to another computing system or device via an ANN training client (e.g., see ANN training client 106).

With respect to FIG. 1, the controller 144 of master computing device 142 can be configured to control training of an ANN (such as via the ANN trainer 148). Not shown in FIG. 1, the controller 144 can be distributed amongst multiple networked computers as can the ANN trainer 148 be distributed amongst multiple networked computers. The training of the ANN can be performed at least partially in separate parts by respective computing devices of parked vehicles (e.g., see computing systems 104 and 204 of respective vehicles 102 and 202). However, in some embodiments, the vehicles used by the controller 144 are not necessarily parked. Although, it may be preferred to use a parked vehicle, since its computing resources would not be used by driving modes of the vehicle; thus, freeing up the computing resources for performing tasks for training the ANN.

The controller 144 can also be configured to separate computing tasks of training the ANN into separated tasks, such as via execution of the ANN trainer 148. The controller 144 can also be configured to assign at least some of the separated tasks to respective selected computing devices of parked vehicles (e.g., see computing systems 104 and 204 of respective vehicles 102 and 202), such as via execution of the ANN trainer 148. The controller 144 can also be configured to receive and assemble results of the separated tasks to train the ANN, such as via execution of the ANN trainer 148. Also, the controller 144 can be configured to train the ANN according to the results of the separated tasks, such as via execution of the ANN trainer 148. The training of the ANN, the training of parts of the ANN, or at least some tasks of the training of the ANN can be performed according to a delta rule.

The communication interface 146 of the master computing device 142, which is communicatively coupled to the controller 144, can be configured to send the assigned tasks to the respective selected computing devices of the parked vehicles. The communication interface 146 can also be configured to receive, from the respective selected computing devices, the results of the assigned tasks.

In some embodiments, the controller 144 is configured to select a computing device of a parked vehicle according to a notification received from the parked vehicle indicating that the vehicle is parked. The selection according to the notification can be done via the ANN trainer 148 as well. Also, the notification received from the parked vehicle can further indicate that the vehicle is authorized for training the ANN. In some embodiments, the notification includes the indication that the vehicle is authorized for training of the ANN without including an indication that the vehicle is parked.

In such embodiments and others, the controller 144, such as via the ANN trainer 148, can be configured to deselect the computing device of the parked vehicle according to a notification received from the parked vehicle indicating that the vehicle is probable to be driven within a time period. The probability that the vehicle is to be driven within a time period can be computed by a device of the vehicle or another computing device and can be based on a rule based algorithm, or artificial intelligence technology (such as an ANN or a decision tree), or any combination thereof.

Also, in such embodiments and others, the controller 144 can be configured to reassign, to another one of the selected computing devices, a task for training the ANN assigned to the deselected computing device when the controller has received the notification that the vehicle is probable to be driven within the time period and a result for the task has not been received from the deselected computing device prior to the time period. The reassignment can be performed via the ANN trainer 148.

In some embodiments, the controller 144 can be configured to maintain, in a queue, respective links to the selected computing devices of the parked vehicles. And, the controller 144 can be configured to remove, from the queue, a respective link of one of the selected computing devices when the one of the selected computing devices is deselected. The aforesaid maintenance and removal of links can be performed via the ANN trainer 148.

In such embodiments, the controller 144 can be configured to select a computing device of a parked vehicle according to a notification received from the parked vehicle indicating that the vehicle is parked. The controller 144 can also be configured to maintain, in the queue, the selected computing device. Also, the notification received from the parked vehicle can further indicate that the vehicle is authorized for training the ANN. The controller 144 can also be configured to deselect the computing device of the parked vehicle according to a notification received from the parked vehicle indicating that the vehicle is probable to be driven within a time period, and remove, from the queue, the deselected computing device. The controller 144 can also be configured to reassign, to another one of the selected computing devices, a task for training the ANN assigned to the deselected computing device when the controller has received the notification that the vehicle is probable to be driven within the time period and a result for the task has not been received from the deselected computing device prior to the time period. The aforesaid selection, maintenance, deselection and/or reassignment can be performed via the ANN trainer 148 as well.

With respect to FIG. 1, a vehicle, such as vehicle 102, 130, or 132, can include a first electronic system configured to generate and output first vehicle information related to whether the vehicle is parked. The first electronic system can be made up of any one or more of the vehicle control modules or ECUs described herein, any one or more of the cameras, GPS devices, or sensors described herein, or any combination thereof (e.g., see body control module 108, powertrain control module 110, power steering control unit 112, sensors 114*a* to 114*b*, GPS device 116, and cameras 118*a* to 118*b*, any of which could be a part of the first electronic system).

In such embodiments and others, the vehicle can include a vehicle computing device (e.g., see computing system 104 which can be, be a part of or include a computing device). In some embodiments, the computing device can be, be a part of, or include an ECU, such as any one of the ECUs described herein. The computing device of the vehicle can be configured to receive the first vehicle information from the first electronic system of the vehicle. The computing device of the vehicle can also be configured to determine whether the vehicle is parked according to the first vehicle information received from the first electronic system. Also, the computing device of the vehicle can be configured to send, to at least one master computing device (e.g., see master computing device 142), a notification indicating that the vehicle is parked and selectable by the at least one master computing device for executing at least one task for training an ANN. The sending by the device of the vehicle can occur when it is determined that the vehicle is parked. The computing device of the vehicle can also be configured to receive and execute at least one task for training the ANN assigned to the vehicle computing device by the at least one master computing device. The receiving and execution of the at least one task, by the device of the vehicle, can also occur while the vehicle is parked.

In such embodiments and others, the vehicle can also include a second electronic system configured to generate and output second vehicle information related to whether the vehicle is probable to be driven within a time period. The second electronic system can be made up of any one or more of the vehicle control modules or ECUs described herein, any one or more of the cameras, GPS devices, or sensors described herein, or any combination thereof (e.g., see body control module 108, powertrain control module 110, power steering control unit 112, sensors 114*a* to 114*b*, GPS device 116, and cameras 118*a* to 118*b*, any of which could be a part of the second electronic system).

In such examples, the vehicle computing device can be configured to receive the second vehicle information from the second electronic system of the vehicle. The vehicle computing device can also be configured to determine whether the vehicle is probable to be driven within a time period according to the second vehicle information received from the second electronic system. And, the vehicle computing device can be configured to send, to the at least one master computing device, a notification indicating that the vehicle is probable to be driven within a time period when it is determined that the vehicle is probable to be driven within the time period. Also, in such examples, the vehicle computing device can be configured to terminate execution of the at least one task for training the ANN when it is determined that the vehicle is probable to be driven within the time period. Also, the vehicle computing device can be configured to prohibit execution of the at least one task for training the ANN when it is determined that the vehicle is probable to be driven within the time period.

In such embodiments and others, the first vehicle information can include a duration of time the vehicle is unoccupied by a person, a duration of time the vehicle is stationary, a duration of time a parking brake of the vehicle is applied, or a duration of time a transmission of the vehicle is set to park, or any combination thereof. The second vehicle information can include an indication of a person entering the vehicle, an indication of a release of the parking brake, or an indication of a change in the transmission from park to a drive mode or gear, or any combination thereof.

In such examples, the first electronic system can include at least one sensor, camera, GPS, or combination thereof that can be configured to sense first parameters related to whether the vehicle is parked. The first parameters can include a duration of time the vehicle is unoccupied by a person, a duration of time the vehicle is stationary, a duration of time a parking brake of the vehicle is applied, or a duration of time a transmission of the vehicle is set to park, or any combination thereof. The at least one sensor, camera, GPS, or combination thereof can also be configured to generate the first vehicle information based on the sensed first parameters.

Also, in such examples and others, the second electronic system can include at least one sensor, camera, GPS, or combination thereof that can be configured to sense second parameters related to whether the vehicle is probable to be driven within a time period. The second parameters can include a person entering the vehicle, a release of the parking brake, or a change in the transmission from park to a drive mode or gear, or any combination thereof. The at least one sensor, camera, GPS, or combination thereof can also be configured to generate the second vehicle information based on the sensed second parameters.

Also, the vehicle computing device can be configured to generate locally ANN-input data for the at least one task for training the ANN (such as when the vehicle is parked). The vehicle computing device can also be configured to receive, from the at least one master computing device, ANN-input data for the at least one task for training the ANN (such as when the vehicle is parked).

Any one of the components of a vehicle described herein can be a part of a system for informing the master computing device(s) 140 (e.g., also see master computing devices 142, 302, and 320 to 322) that a vehicle computing system (e.g., see computing system 104 or 204) is ready and/or authorized to be selected for performing a task of training an ANN.

Also, although readiness of a vehicle computing system to be selected has been shown to be when the host vehicle is parked, it is to be understood that another state of the vehicle or another state of a part of the vehicle can be the indicator that the vehicle computing system is ready for performing a task of training an ANN. Also, for the most part of this disclosure, a vehicle being in a state wherein it is about to driven is described as a deciding factor in deselecting its computing system for performing a task of training an ANN. However, it is to be understood that another state of the vehicle or another state of a part of the vehicle can be the indicator that the vehicle computing system is ready to be deselected for performing a task of training an ANN.

Besides vehicle computing devices (e.g., see computing systems 104 and 204 of vehicles 102 and 202 respectively), the vehicles disclosed herein include vehicle electronics, including at least electronics for the controllable parts of a body, the controllable parts of a powertrain, and the controllable parts of power steering. The vehicles disclosed herein can include controllable parts of the body and such parts and subsystems can be connected to a body control module (e.g., see module 108). The body can include at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module can control the controllable parts of the body.

Also, vehicles disclosed herein can include the controllable parts of a powertrain. The controllable parts of the powertrain and its parts and subsystems are connected to a powertrain control module (e.g., see module 110). The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain. Also, power steering parts that are controllable can be controlled via a power steering control unit (e.g., see control unit 112).

UI elements described herein, such UI elements of a mobile device, another type of computing device, or a vehicle can include any type of UI. The UI elements can be, be a part of, or include a car control and can be, include or be a part of an electronic system. Also, a UI can be a gas pedal, a brake pedal, or a steering wheel. Also, a UI can be a part of or include an electronic device and/or an electrical-mechanical device and can be a part of or include a tactile UI (touch), a visual UI (sight), an auditory UI (sound), an olfactory UI (smell), an equilibria UI (balance), or a gustatory UI (taste), or any combination thereof.

Sensors described herein (e.g., see sensors 114*a* to 114*b*) and cameras described herein (e.g., see cameras 118*a* to 118*b*) of vehicles can include any type of sensor or camera respectively configured to sense and/or record one or more features or characteristics of the plurality of UI elements or output thereof or any other part of a vehicle or its surroundings. A sensor or a camera of a vehicle can also be configured to generate data corresponding to the one or more features or characteristics of the plurality of UI elements or output thereof or any other part of the vehicle or its surroundings according to the sensed and/or recorded feature(s) or characteristic(s). A sensor or a camera of the vehicle can also be configured to output the generated data corresponding to the one or more features or characteristics. Any one of the plurality of sensors or cameras can also be configured to send, such as via a CAN bus, the generated data corresponding to the one or more features or characteristics to a computing system (such as computing system 104 or 204) or other electronic circuitry of a vehicle.

A set of mechanical components for controlling the driving of a vehicle described herein can include: (1) a brake mechanism on wheels of the vehicle (for stopping the spinning of the wheels), (2) a throttle mechanism on an engine or motor of the vehicle (for regulation of how much gas goes into the engine, or how much electrical current goes into the motor), which determines how fast a driving shaft can spin and thus how fast the vehicle can run, and (3) a steering mechanism for the direction of front wheels of the vehicle (for example, so the vehicle goes in the direction of where the wheels are pointing to). These mechanisms can control the braking (or deacceleration), acceleration (or throttling), and steering of the vehicle. The user indirectly controls these mechanism by UI elements (e.g., see other components 216 of vehicle 202 shown in FIG. 2) that can be operated upon by the user, which are typically the brake pedal, the acceleration pedal, and the steering wheel. The pedals and the steering wheel are not necessarily mechanically connected to the driving mechanisms for braking, acceleration and steering. Such parts can have or be proximate to sensors that measure how much the driver has pressed on the pedals and/or turned the steering wheel. The sensed control input is transmitted to the control units over wires (and thus can be drive-by-wire). Such control units can include body control module 108 or 220, powertrain control module 110 or 222, power steering control unit 112 or 224, battery management system 226, etc. Such output can also be sensed and/or recorded by the sensors and cameras described herein (e.g., see sensors 114*a* to 114*b* or 217*a* to 217*b* and cameras 118*a* to 118*b* or 219*a* to 219*b*). And, the output of the sensors and cameras can be further processed, such as by the ANN training client 106, and then reported to external computing devices (such as the master computing device(s) 140) for cumulative data processing.

In a vehicle, such as vehicle 102 or 202, a driver can control the vehicle via physical control elements (e.g., steering wheel, brake pedal, gas pedal, paddle gear shifter, etc.) that interface drive components via mechanical linkages and some electro-mechanical linkages. However, more and more vehicles currently have the control elements interface the mechanical powertrain elements (e.g., brake system, steering mechanisms, drive train, etc.) via electronic control elements or modules (e.g., electronic control units or ECUs). The electronic control elements or modules can be a part of drive-by-wire technology.

Drive-by-wire technology can include electrical or electro-mechanical systems for performing vehicle functions traditionally achieved by mechanical linkages. The technology can replace the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders can be eliminated from the vehicle. There are varying degrees and types of drive-by-wire technology.

In such embodiments and others, the plurality of UI can include a steering control (e.g., a steering wheel or a GUI or another type of UI equivalent such as a voice input UI for steering). Also, the plurality of UI can include a braking control (e.g., a brake pedal or a GUI or another type of UI equivalent such as a voice input UI for braking). The plurality of UI can also include a throttling control (e.g., a gas pedal or a GUI or another type of UI equivalent such as a voice input UI for accelerating the vehicle). Also, the plurality of UI can include a transmission control (e.g., manual gearbox and driver-operated clutch or a GUI or another type of UI equivalent such as a voice input UI for changing gears of the vehicle).

In some embodiments, the electronic circuitry of a vehicle (e.g., see vehicles 102 and 202), which can include or be a part of the computing system of the vehicle, can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 108 and 220, powertrain control modules 110 and 222, power steering control units 112 and 224, battery management system 226, and infotainment electronics 228 shown in FIGS. 1 and 2 respectively). In some embodiments, the electronic circuitry of the vehicle can include electronics for an automated driving system.

In some embodiments, the computing system of the vehicle (such as computing system 104 or 204) can include a central control module (CCM), central timing module (CTM), and/or general electronic module (GEM). Also, in some embodiments, the vehicle can include an ECU, which can be any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake control module, and battery management system.

As shown in FIG. 2, the networked system 100 can include at least vehicles 130 to 132 and vehicle 202 which includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communication network(s) 122 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204 that can include and implement the ANN training client 106. The computing system 204 can be communicatively coupled to the network(s) 122 as shown. The computing system 204 includes at least a bus 206, a controller 208 (such as a CPU) that can execute instructions of the ANN training client 106, memory 210 that can hold the instructions of the ANN training client 106 for execution, a network interface 212, a data storage system 214 that can store instructions for the ANN training client 106, and other components 216—which can be any type of components found in mobile or computing devices such as GPS components, I/O components such as a camera and various types of user interface components (which can include one or more of the plurality of UI elements described herein) and sensors (which can include one or more of the plurality of sensors described herein). The other components 216 can include one or more user interfaces (e.g., GUIs, auditory user interfaces, tactile user interfaces, car controls, etc.), displays, different types of sensors, tactile, audio and/or visual input/output devices, additional application-specific memory, one or more additional controllers (e.g., GPU), or any combination thereof. The computing system 204 can also include sensor and camera interfaces that are configured to interface sensors and cameras of the vehicle 202 which can be one or more of any of the sensors or cameras described herein (e.g., see sensors 217*a* to 217*b* and cameras 219*a* to 219*b*). The bus 206 communicatively couples the controller 208, the memory 210, the network interface 212, the data storage system 214, the other components 216, and the sensors and cameras as well as sensor and camera interfaces in some embodiments. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computing system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 122).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 122 via the vehicle computing system 204. Also, shown, vehicles 130 to 132 and master computing device(s) 140 are connected to the network(s) 122, and, thus, are communicatively coupled to the vehicle 202.

The vehicle 202 is also shown having the plurality of sensors (e.g., see sensors 217*a* to 217*b*) and the plurality of cameras (e.g., see cameras 219*a* to 219*b*), which can be part of the computing system 204. In some embodiments, the CAN bus 218 can connect the plurality of sensors and the plurality of cameras, the vehicle computing system 204, the vehicle body control module, the powertrain control module, the power steering control unit, the battery management system, and the infotainment electronics to at least the computing system 204. The plurality of sensors and the plurality of cameras can be connected to the computing system 204 via sensor and camera interfaces of the computing system.

Any one of the components of a vehicle described herein can be a part of a system for informing the master computing device(s) 140 (e.g., also see master computing devices 142, 302, and 320 to 322) that a vehicle computing system (e.g., see computing system 104 or 204) is ready and/or authorized to be selected for performing a task of training an ANN.

Also, although readiness of a vehicle computing system to be selected has been shown to be when the host vehicle is parked, it is to be understood that another state of the vehicle or another state of a part of the vehicle can be the indicator that the vehicle computing system is ready for performing a task of training an ANN. Also, for the most part of this disclosure, a vehicle being in a state wherein it is about to be driven is described as a deciding factor in deselecting its computing system for performing a task of training an ANN. However, it is to be understood that another state of the vehicle or another state of a part of the vehicle can be the indicator that the vehicle computing system is ready to be deselected for performing a task of training an ANN.

As shown in FIG. 3, in some embodiments the networked system 100 can include multiple master computing devices (e.g., see master computing devices 302 and 320 to 322). The master computing device 302, which can have somewhat similar structure and/or functionality as the master computing device 142, can be connected to communication network(s) 122. And, thus, be connected to vehicles 102, 202, and 130 to 132 as well as master computing devices 320 to 322. Although not depicted, the master computing device 302 (or master computing device 320 or 322) can include one or more sensors, one or more UI elements, a GPS device, and/or one or more cameras. Thus, the master computing device 302 (or master computing device 320 or 322) can act similarly to computing system 104 or 204 and can host and run the ANN training client 106 as well in some embodiments.

The master computing device 302 can be, be a part of, or include one or more server computers. Also, the master computing device 302 can be, be a part of, or include, depending on the embodiment, a mobile device, a smartphone, tablet computer, IoT device, smart television, smart watch, glasses or other smart household appliance, in-vehicle information system, wearable smart device, game console, PC, or digital camera, or any combination thereof. As shown, the master computing device 302 can be connected to communication network(s) 122 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the master computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the master computing device 302, in accordance with some embodiments of the present disclosure. The master computing device 302 can be communicatively coupled to the network(s) 122 as shown. The master computing device 302 includes at least a bus 306, a controller 308 (such as a CPU), memory 310, a network interface 312, and a data storage system 314. Not depicted, the master computing device 302 can also include other components such as any type of components found in computing devices—e.g., GPS components, I/O components such as various types of user interface components, sensors, and one or more cameras. The bus 306 communicatively couples the controller 308, the memory 310, the network interface 312, the data storage system 314 and the other components 316. The master computing device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of master computing device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 308—which can be, include, or be a part of controller 144—represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein (e.g., the controller can be configured to execute instructions of the ANN trainer 148 for performing the operations of the ANN trainer). Controller 308 can further include a network interface device such as network interface 312 to communicate over one or more communications network (such as network(s) 122).

The data storage system 314 can include a machine-readable storage medium (also known as a computer-readable medium) on which is stored one or more sets of instructions or software embodying any one or more of the methodologies or functions described herein (such as at least a part of the ANN trainer 148). The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 4:
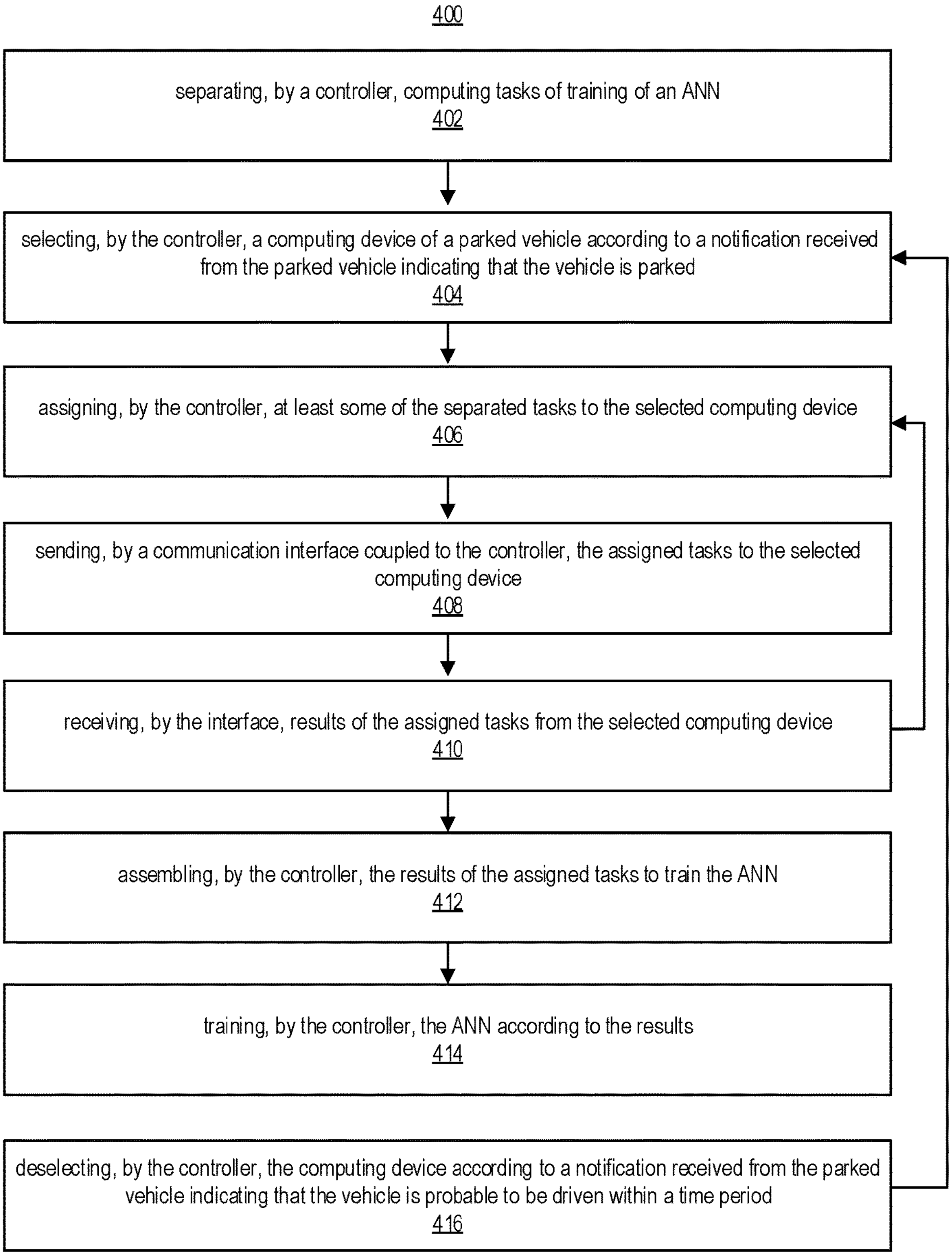
FIGS. 4 to 6 illustrate flow diagrams of example operations that can be performed by aspects of the networked system depicted in FIGS. 1 to 3, in accordance with some embodiments of the present disclosure.

FIG. 4 illustrates a flow diagram of example operations of method 400 that can be performed by aspects of the networked system depicted in FIGS. 1 to 3, in accordance with some embodiments of the present disclosure. For example, the method 400 can be performed by master computing device(s) 140, master computing device 142, master computing device 302, and/or master computing devices 320 to 322.

In FIG. 4, the method 400 begins at step 402 with separating, by a controller, computing tasks of training of an ANN. The step 402 can be performed by a controller of a system for training of an ANN (such as a system including master computing device(s) 140, master computing device 142, master computing device 302, and/or master computing devices 320 to 322). At step 404, the method 400 continues with selecting, by the controller, a computing device of a parked vehicle according to a notification received from the parked vehicle indicating that the vehicle is parked. The vehicle does not necessarily need to be parked in some embodiments. In such embodiments, the notification may merely indicate that the computing device of the vehicle is authorized to be used by the controller.

At step 406, the method 400 continues assigning, by the controller, at least some of the separated tasks to the selected computing device. At step 408, the method 400 continues sending, by a communication interface coupled to the controller, the assigned tasks to the selected computing device. At step 410, the method 400 continues with receiving, by the communication interface, results of the assigned tasks from the selected computing device. At step 412, the method 400 continues with assembling, by the controller, the results of the assigned tasks to train the ANN. The controller in some example cases can assemble the results with other results of assigned tasks performed at other computing devices of other vehicles to train the ANN. Also, such results can be assembled with results from training tasks performed by the controller or another computing device that is not a part of a vehicle, such as a mobile device of a user who has authorized the mobile device to assist with training the ANN. At step 414, the method 400 continues with training, by the controller, the ANN according to the results.

At step 416, the method 400 continues with deselecting, by the controller, the computing device of the parked vehicle according to a notification received from the parked vehicle indicating that the vehicle is probable to be driven within a time period. Step 416 can occur after the training of the ANN at step 414 or at a time prior to the training. For example, the step 416 can occur prior to the communication interface receiving the results of the assigned tasks from the selected computing device at step 410. In such an example situation, after the step 416 of the deselection of the computing device, another computing device can be selected. For example, as shown in FIG. 4, step 404 can be repeated for another computing device after deselection of the computing device at step 416. And, then at step 406, the at least some of the separated tasks initially assigned to the computing device can be reassigned to another computing device (such as another computing device of another vehicle that was recently discovered to be parked). Also, as shown in FIG. 4, steps 406 to 410 can be repeated until the controller is ready to assemble the results of the assigned tasks at step 412.

Figure 5:
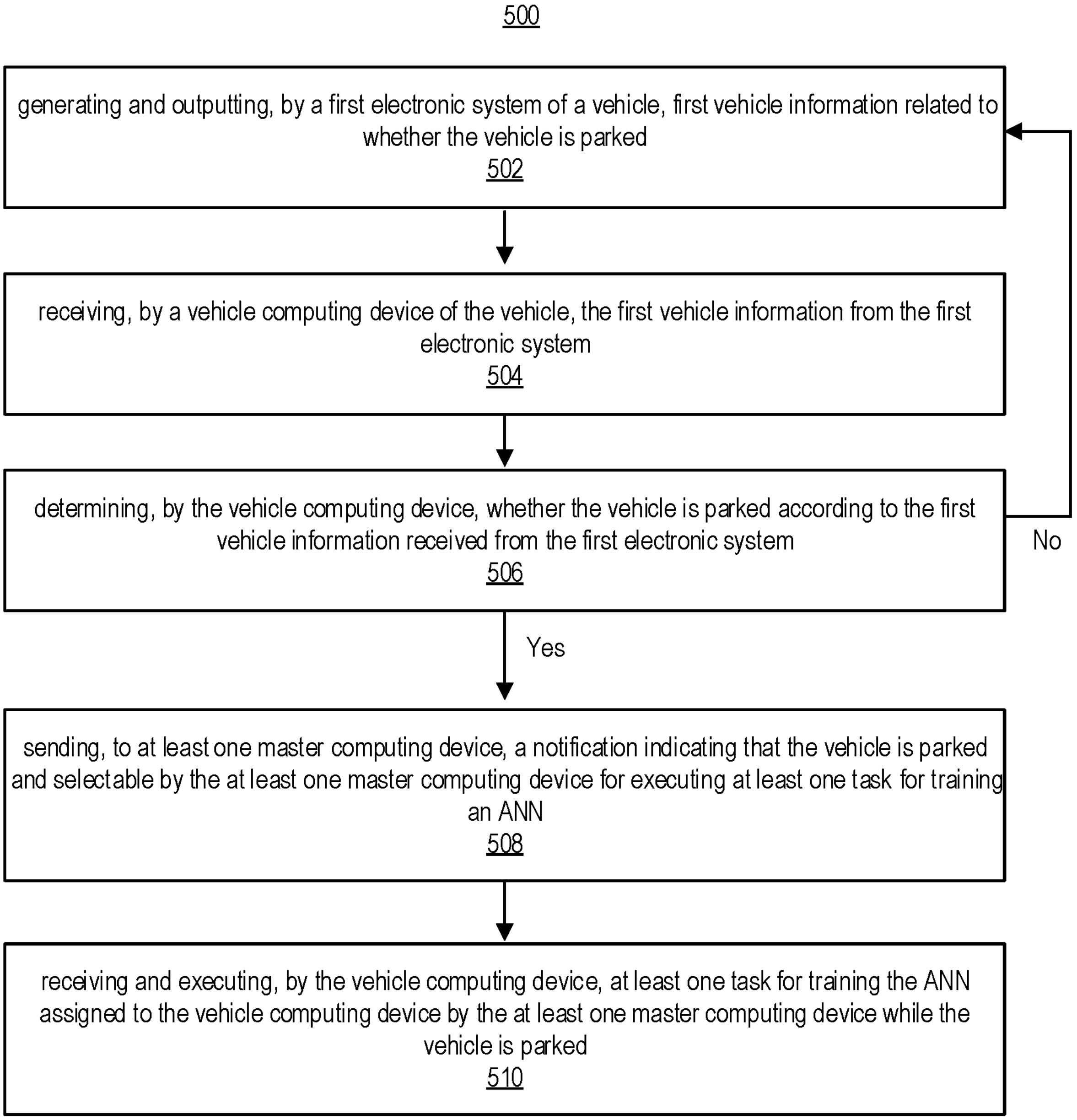

FIG. 5 illustrates a flow diagram of example operations of method 500 that can be performed by aspects of the networked system depicted in FIGS. 1 to 3, in accordance with some embodiments of the present disclosure. For example, parts of the method 500 can be performed by a computing system of a vehicle such as computing system 104 or 204.

In FIG. 5, the method 500 begins at step 502 with generating and outputting, by a first electronic system of a vehicle, first vehicle information related to whether the vehicle is parked. The first electronic system can be made up of any one or more of the vehicle control modules or ECUs described herein, any one or more of the cameras, GPS devices, or sensors described herein, or any combination thereof.

At step 504, the method 500 continues with receiving, by a vehicle computing device of the vehicle (such as a vehicle computing device of or including the vehicle computing system 104 or 204), the first vehicle information from the first electronic system. At step 506, the method 500 continues with determining, by the vehicle computing device, whether the vehicle is parked according to the first vehicle information received from the first electronic system. When it is determined that the vehicle is parked, the method 500 can continue, at step 508, with sending, to at least one master computing device (e.g., see master computing device(s) 140, master computing device 142, master computing device 302, and master computing devices 320 to 322), a notification indicating that the vehicle is parked and selectable by the at least one master computing device for executing at least one task for training an ANN. Otherwise, the method 500 can continue, at step 502, with generating and outputting, by the first electronic system, vehicle information related to whether the vehicle is parked.

At step 510, the method 500 continues with receiving and executing, by the vehicle computing device, at least one task for training the ANN assigned to the vehicle computing device by the at least one master computing device while the vehicle is parked.

Figure 6:
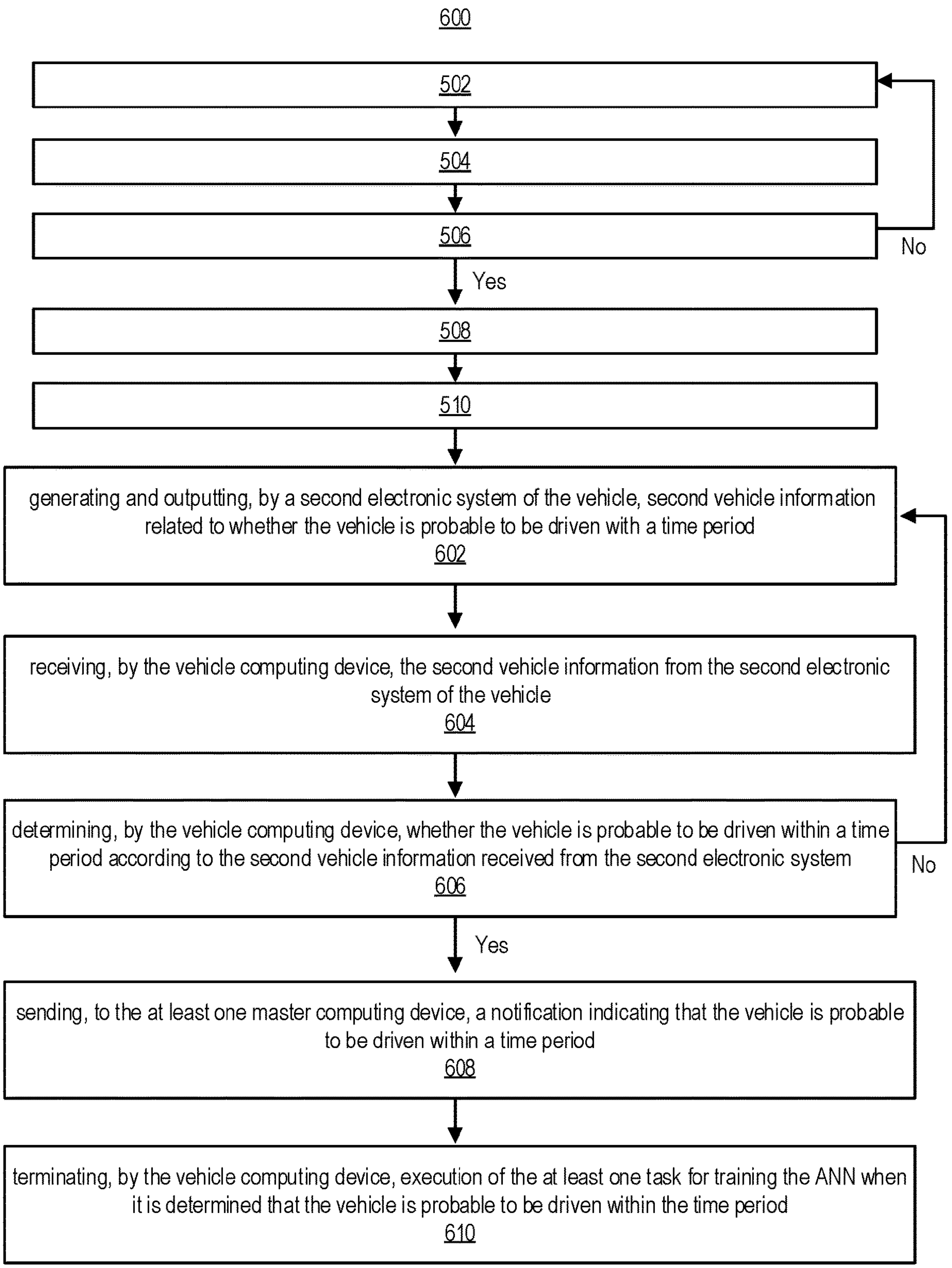

FIG. 6 illustrates a flow diagram of example operations of method 600 that can be performed by aspects of the networked system depicted in FIGS. 1 to 3, in accordance with some embodiments of the present disclosure. For example, parts of the method 600 can be performed by a computing system of a vehicle such as computing system 104 or 204. As shown, the method 600 can begin subsequent to method 500, and step 602 can depend on the occurrence of step 510 of method 500.

At step 602, the method 600 continues with generating and outputting, by a second electronic system of the vehicle, second vehicle information related to whether the vehicle is probable to be driven within a time period. The second electronic system can be made up of any one or more of the vehicle control modules or ECUs described herein, any one or more of the cameras, GPS devices, or sensors described herein, or any combination thereof.

At step 604, the method 600 continues with receiving, by the vehicle computing device, the second vehicle information from the second electronic system of the vehicle. At step 606, the method 600 continues with determining, by the vehicle computing device, whether the vehicle is probable to be driven within a time period according to the second vehicle information received from the second electronic system. When it is determined that the vehicle is probable to be driven within a time period, the method 600 continues, at step 608, with sending, to the at least one master computing device, a notification indicating that the vehicle is probable to be driven within a time period. Also, at step 610, the method 600 continues with terminating, by the vehicle computing device, execution of the at least one task for training the ANN when it is determined that the vehicle is probable to be driven within the time period. Otherwise, as shown in FIG. 6, the method 600 continues with the step 602 of generating and outputting, by the second electronic system, vehicle information related to whether the vehicle is probable to be driven within a time period.

In some embodiments, it is to be understood that the steps of methods 400, 500, or 600 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure of FIGS. 4 to 6 represents a minimal method within a possibly larger method of a computer system more complex than the ones presented partly in FIGS. 1 to 3. Thus, the steps depicted in each figure of FIGS. 4 to 6 can be combined with other steps feeding in from and out to other steps associated with a larger method of a more complex system.

The ANNs described herein can be used by a drive-by-wire process of a vehicle, or an automated driving system of the vehicle, or any combination thereof. Also, ANNs described herein can be used by a visual data processing pipeline of a vehicle for processing data derived from recorded environmental features captured by one or more cameras of the vehicle or another vehicle. Also, ANNs described herein can be used by a visual data processing pipeline in general. The ANNs described herein can also be used by a non-visual data processing pipeline of a vehicle for processing data derived from sensed environmental features captured by one or more sensors of the vehicle or another vehicle. Also, the ANN of such examples as well as any other ANN described herein can be used by a non-visual data processing pipeline in general.

Also, ANNs described herein can be used by a vehicle routing application, a video game, or a medical application. The ANNs described herein can also be used by a business application for at least one of sales forecasting, customer or market research, data validation, or risk management, or any combination thereof. Also, the ANNs described herein can be used by a speech recognition system or an image recognition system. In general, ANNs described herein can be used for any machine learning task that includes or does not include supervised learning. For example, an ANN described herein can be used for medical diagnosis, solving business and/or technical problems, machine translation, network filtering, filtering in big data systems, playing video games, and real-time generation of new parts of video games and multi-media. Also, ANNs described herein can even be used to guide decision making in vehicular automation and self-driving cars.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:

at least one processing device; and memory containing instructions configured to instruct the at least one processing device to:

control training for an artificial neural network (ANN);

maintain, in a queue, links to computing devices of a plurality of vehicles, wherein the computing devices perform tasks for training the ANN; and remove a link in the queue to the at least one computing device based on receipt of a notification of a probability of a state change of the at least one computing device of the computing devices within a time period.

2. The apparatus of claim 1, wherein removing a link comprises reassigning a task from the at least one computing device to another computing device.

3. The apparatus of claim 1, wherein the instructions are further configured to instruct the processing device to receive a notification from the at least one computing device regarding a respective processing capability, and separate computing tasks of training the ANN into separated tasks.

4. The apparatus of claim 3, wherein the instructions are further configured to instruct the processing device to assign the separated tasks to computing devices of the vehicles.

5. The apparatus of claim 1, wherein the instructions are further configured to instruct the processing device to deselect a first computing device of a first vehicle in response to a notification from the first vehicle regarding resource availability.

6. The apparatus of claim 1, wherein links are added to the queue or removed from the queue based on information received from the vehicles regarding a state of an ECU of the respective vehicle.

7. The apparatus of claim 1, wherein links are added to the queue or removed from the queue based on information received from the vehicles regarding activity associated with respective transmissions of the vehicles.

8. The apparatus of claim 1, wherein a first notification from a first computing device includes data regarding an indication of a person entering a vehicle.

9. The apparatus of claim 1, wherein adding a link to the queue is subject to receiving a notification from a corresponding computing device indicating that the computing device is authorized for training the ANN.

10. An apparatus comprising:

at least one processing device; and memory containing instructions configured to instruct the at least one processing device to:

control training for an artificial neural network (ANN);

maintain, in a queue, links to computing devices of a plurality of vehicles, wherein the computing devices perform tasks for training the ANN;

receive a notification from a first computing device indicating that the first computing device is not available for training the ANN and indicating a probability of a state change of the first computing device within a time period; and in response to receiving the notification, remove a link in the queue to the first computing device.

11. The apparatus of claim 10, wherein the at least one processing device is further instructed to deselect the first computing device based on the probability of the state change of the first computing device within the time period.

12. The apparatus of claim 11, wherein the at least one processing device is further instructed to remove the link in the queue to the first computing device after the first computing device is deselected.

13. The apparatus of claim 10, wherein the at least one processing device is further instructed to reassign at least one task associated with training the ANN assigned to the first computing device to a second computing device of the computing devices.

14. The apparatus of claim 10, wherein the at least one processing device is further instructed to determine if the first computing device is authorized to train the ANN.

15. The apparatus of claim 10, wherein the at least one processing device is further instructed to terminate at least one task intended for the first computing device in response to the notification.

16. The apparatus of claim 10, wherein the at least one processing device is further instructed to add a second link to the queue for a second computing device of the computing devices based on a processing capability of the second computing device.

17. The apparatus of claim 10, wherein the at least one processing device is further instructed to separate the tasks for training the ANN to be performed by each computing device of the computing devices.

18. The apparatus of claim 10, wherein the at least one processing device is further instructed to send the tasks to at least one other computing device of the computing devices after removing the link to the first computing device.

19. An apparatus comprising:

at least one processing device; and memory containing instructions configured to instruct the at least one processing device to:

control training for an artificial neural network (ANN);

maintain, in a queue, links to computing devices of a plurality of vehicles, wherein the computing devices perform tasks for training the ANN, the maintaining including removing a first link to a first computing device based on receipt of a notification indicating a probability of a state change for the first computing device within a time period;

separate computing tasks of training the ANN into separated tasks; and assign the separated tasks to the computing devices of the vehicles.

20. The apparatus of claim 19, wherein the at least one processing device is further instructed to add a second link to a second computing device based on a different notification indicating a state change for the second computing device.

21. The apparatus of claim 20, wherein the at least one processing device is further configured to receive a result of processing at least one task of the tasks assigned to the second computing device.

* * * * *